US012371637B2

(12) United States Patent
Declercq

(10) Patent No.: US 12,371,637 B2
(45) Date of Patent: Jul. 29, 2025

(54) LIQUID CONDITIONING COMPOSITIONS COMPRISING AN ESTER QUAT DERIVED IN PART FROM TRANS FATTY ACIDS

(71) Applicant: The Procter & Gamble Company, Cincinnati, OH (US)

(72) Inventor: Marc Johan Declercq, Strombeek-Bever (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/522,975

(22) Filed: Nov. 10, 2021

(65) Prior Publication Data

US 2022/0154106 A1 May 19, 2022

(30) Foreign Application Priority Data

Nov. 16, 2020 (EP) .................................... 20207807

(51) Int. Cl.
*C11D 3/00* (2006.01)
*C11D 3/30* (2006.01)

(52) U.S. Cl.
CPC .............. *C11D 3/0015* (2013.01); *C11D 3/30* (2013.01); *C11D 2111/12* (2024.01)

(58) Field of Classification Search
CPC ...... C11D 3/0015; C11D 3/13; C11D 11/0017
See application file for complete search history.

(56) References Cited

U.S. PATENT DOCUMENTS 4,510,077 A * 4/1985 Elton ....................... H01B 1/04 252/502
4,967,159 A * 10/1990 Manes ................... G01R 27/06 324/650
5,545,340 A 8/1996 Wahl et al.
5,562,849 A 10/1996 Wahl et al.
6,180,674 B1 * 1/2001 De Lera ................. A61Q 19/00 562/405
6,342,208 B1 * 1/2002 Hyldgaard ............. A61K 8/442 424/59
6,875,735 B1 * 4/2005 Frankenbach ....... C11D 3/2044 510/522
6,995,131 B1 * 2/2006 Frankenbach ....... C11D 3/0015 510/525
8,026,206 B2 9/2011 Sajic et al.
8,183,199 B2 5/2012 Fossum et al.
9,796,662 B2 * 10/2017 Allen ....................... C11D 1/90
9,861,558 B2 * 1/2018 Lynch .................... A61K 8/345
10,689,600 B2 * 6/2020 Dykstra ................. C11D 3/222
2002/0037825 A1 * 3/2002 Demeyere ............ C11D 3/0015 510/330
2005/0075497 A1 * 4/2005 Utz ........................ A61Q 19/00 536/114
2005/0118130 A1 * 6/2005 Utz ...................... A61K 8/9789 424/70.13
2006/0058215 A1 * 3/2006 Trinh ................... C11D 3/2044 510/515
2008/0207940 A1 8/2008 Joyce et al.
2008/0234165 A1 * 9/2008 Panandiker ............ C11D 1/146 510/343
2013/0225859 A1 8/2013 Allen et al.
2015/0031592 A1 * 1/2015 Barreleiro .............. C11D 3/001 510/463
2016/0264913 A1 * 9/2016 Luneau .................. C11D 3/373
2016/0326467 A1 * 11/2016 Qin ......................... C09B 11/10
2017/0144142 A1 * 5/2017 Balasundaram ......... B01J 31/22
2018/0042845 A1 * 2/2018 Sinai .................... A61K 36/185
2019/0183764 A1 * 6/2019 Krohn ...................... A61K 8/92
2019/0225916 A1 * 7/2019 Sivik .................... C11D 3/3749
2020/0224124 A1 * 7/2020 Bautista Cid ............ C11D 3/30
2020/0239811 A1 7/2020 Burgo
2022/0025293 A1 * 1/2022 Meier .................... C11D 3/046
2022/0154106 A1 * 5/2022 Declercq .................. C11D 1/62

FOREIGN PATENT DOCUMENTS

| | | | | |
|---|---|---|---|---|
| BR | 102017010609 | A2 | | 12/2018 |
| IN | 2008DE02909 | A | | 8/2016 |
| RU | 2014106569 | A | * | 8/2015 |
| WO | 2014069833 | A1 | | 5/2014 |
| WO | 2020120268 | A1 | | 6/2020 |

OTHER PUBLICATIONS

RU2014106569 (A) Velikorodov et al.—Aug. 27, 2015 A Translation. (Year: 2015).*
PCT Search Report and Written Opinion for PCT/US2021/072312 dated May 19, 2022, 10 pages.
Extended EP Search Report and Written Opinion for EP20207807.7 dated May 4, 2021, 10 pages.
Daniel et al: "Nonhydrogenated Cottonseed Oil Can Be Used as aDeep Fat Frying Medium to Reduce Trans-Fatty Acid Content in FrenchFries", Journal of the American Dietetic Association, The Association, Chicago, IL, US, vol. 105, No. 12, Dec. 1, 2005 (Dec. 1, 2005 ), pp. 1927-1932, XP005188233, ISSN:0002-8223, DOI: 10.1016/J.JADA.2005.09.029.
Dinesh K. Agarwal et al. "Cottonseed Oil Quality, Utilization and Processing", vol. 25, Sep. 26, 2003, pp. 1-16.

(Continued)

*Primary Examiner* — Peter F Godenschwager
*Assistant Examiner* — M. Reza Asdjodi
(74) *Attorney, Agent, or Firm* — Carolyn S. Powell; Andrew J. Mueller

(57) ABSTRACT

Liquid conditioning compositions that include alkyl ester quaternary ammonium ("ester quat") softening actives, where the ester quat softening actives are derived in part from trans-unsaturated fatty acids, such as elaidic acid. Related methods and uses.

12 Claims, No Drawings

(56) References Cited

OTHER PUBLICATIONS

Spinneys, “Purity fabric softener”, Retrieved from https://www.spinneys.com/en-ae/catalogue/purity-fabric-softener-125ltr_3746/ ,No Known date, 4 pages.
SUNJIN Chemical Co. LTD, “Surfactant Catalogs, SUNJIN” No known date, pp. 1-40.

* cited by examiner

LIQUID CONDITIONING COMPOSITIONS COMPRISING AN ESTER QUAT DERIVED IN PART FROM TRANS FATTY ACIDS

FIELD OF THE INVENTION

The present disclosure relates to liquid conditioning compositions that include alkyl ester quaternary ammonium ("ester quat") softening actives derived in part from trans-unsaturated fatty acids, such as elaidic acid. The present disclosure also relates to related methods and uses.

BACKGROUND OF THE INVENTION

Manufacturers and consumers alike desire liquid conditioning composition that have a thick consistency. Liquid compositions having a relatively high viscosity tend to connote a luxurious usage experience. Furthermore, consumers may associate thicker compositions with better performance, perhaps believing that the rich consistency is the result of higher amounts of active ingredients compared to runnier compositions.

The manufacturer is thus faced with the challenge of efficiently building viscosity, particularly in compositions that have relatively low amounts of active ingredients. Rheology modifiers and/or structurants (such as polymeric materials) may be added to increase the viscosity of the liquid compositions. However, as these additives tend to provide few end-use performance benefits, it is typically preferred if the added expense and complexity of such ingredients can be avoided or at least minimized.

Furthermore, modern manufacturers, vendors, and consumers may prefer products that include natural and/or sustainably sourced materials. Many rheology modifiers and structurants, on the other hand, are synthetic in origin, and therefore may be less preferred.

There is a need for liquid conditioning compositions that have desirable and efficiently built viscosity profiles, and that preferably use naturally derived ingredients to do it.

SUMMARY OF THE INVENTION

The present disclosure relates to liquid conditioning compositions, such as liquid fabric enhancers, that include certain ester quat softening actives.

For example, the present disclosure relates to liquid conditioning compositions that include: from about 2% to about 20%, by weight of the composition, of an alkyl ester quaternary ammonium ("ester quat") softening active, where the ester quat softening active is derived from a fatty acid feedstock, where the fatty acid feedstock includes fatty acids that are derived from plants, where the fatty acid feedstock includes less than 25%, by weight of the fatty acid feedstock, of C16 fatty acids, and where the fatty acid feedstock includes from about 4% to about 20%, by weight of the fatty acid feedstock of trans-unsaturated fatty acids.

The present disclosure also relates to methods of treating a surface, where the method includes the step of contacting a surface, preferably a fabric, more preferably a fabric comprising cotton fibers, with a liquid conditioning composition according the present disclosure, optionally in the presence of water.

The present disclosure also relates to a concentrated softening active composition that may be used to make the liquid conditioning compositions of the present disclosure, where the concentrated softening active composition includes: from about 60% to 99%, by weight of the composition, of an alkyl ester quaternary ammonium ("ester quat") softening active that is derived at least in part from cottonseed oil, as described above; and a liquid carrier selected from the group consisting of water, surfactant, or organic solvent.

The present disclosure also relates to the use of an alkyl ester quaternary ammonium ("ester quat") softening active, preferably as part of a liquid conditioning composition, to condition cotton fibers, where the ester quat softening active is derived from a fatty acid feedstock, where the fatty acid feedstock includes fatty acids that are derived from cottonseed oil.

DETAILED DESCRIPTION OF THE INVENTION

The present disclosure relates to liquid conditioning compositions, such as liquid fabric enhancers, that include certain alkyl quaternary ammonium ester ("ester quat") materials. The ester quat materials are formed from fatty acid feedstocks that include particular amounts of unsaturated fatty acids having trans bonds. Furthermore, it is been found that such fatty acids can conveniently derived from plants, particularly after partial hydrogenation. Plant-derived material that may be particularly useful may come from cottonseed, rapeseed, sunflower seed, or soy, particularly from cottonseed.

It has been found that the ester quat materials described herein are surprisingly effective at building viscosity in liquid compositions, particularly in those that have a relatively low amount of active ingredients (e.g., ester quats) and/or relatively high amounts of water. Without wishing to be bound by theory, it is believed that presence of trans-unsaturated fatty acids, such as elaidic acid, in the feedstock material increases the crystallinity of the self-assembled ester quat material. It is believed that this results in the formation of larger and/or more rigid structures that are relatively resistant to flow; therefore, the viscosity of the dispersion is increased, which reduces the need for structurants or other rheology modifiers.

Cottonseed-derived materials may be particularly preferred for treating cotton-containing fabrics, as consumers may view such processes as being especially environmentally friendly, in that they are bringing "like" materials together in a treatment regimen.

The materials, compositions, processes, and uses of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Liquid Conditioning Composition

The present disclosure relates to liquid conditioning compositions. The liquid conditioning composition may be a fabric care composition or a hair care composition, preferably a liquid fabric enhancer or a hair conditioner, more preferably a liquid fabric enhancer.

The liquid conditioning composition may have a viscosity from about 50 cps to about 300 cps (about 50 mPa·s to about 300 mPa·s). The viscosity is determined using a Brookfield viscometer, No. 2 spindle, at 60 RPM/s, measured at about 22° C. Compositions having viscosities lower than what is provided here may be viewed as too runny and seen as "cheap"; compositions having relatively higher viscosities may result in processing or dispensing challenges.

The liquid conditioning composition may be characterized by a dynamic yield stress. For example, the dynamic yield stress at 20° C. of the fabric softener composition may be from 0.001 Pa to 1.0 Pa, preferably from 0.005 Pa to 0.8 Pa, more preferably from 0.01 Pa to 0.5 Pa. The absence of a dynamic yield stress may lead to phase instabilities such as particle creaming or settling in case the liquid composition comprises suspended particles or encapsulated benefit agents. Very high dynamic yield stresses may lead to undesired air entrapment during filling of a bottle with the fabric softener composition. Dynamic yield stress is determined according to the method provided in the Test Methods section below.

The liquid conditioning compositions of the present disclosure may be characterized by a pH of from about 2 to about 12, or from about 2 to about 8.5, or from about 2 to about 7, or from about 2 to about 5. The compositions of the present disclosure may have a pH of from about 2 to about 4, preferably a pH of from about 2 to about 3.7, more preferably a pH from about 2 to about 3.5, preferably in the form of an aqueous liquid. It is believed that acidic pH levels facilitate stability of the ester quat. The pH of a composition is determined by dissolving/dispersing the composition in deionized water to form a solution at 10% concentration, at about 20° C.

The liquid conditioning compositions of the present disclosure may comprise water. The liquid conditioning composition may comprise from about 40% to about 98%, or from about 50% to about 96%, or from about 75% to about 95%, or from about 80% to about 94%, by weight of the composition, of water. Water levels may be selected to as to balance the amount of the softening active to a desired level. The selection of the ester quats described herein is believed to be particularly useful in compositions that comprise a relatively high amount of water, as such ingredients can provide both performance and viscosity-building benefits.

The liquid conditioning composition may be packaged in a pourable bottle. The liquid conditioning composition may be packaged in an aerosol can or other spray bottle. The packaging may be translucent or transparent.

Ester Quat

The liquid conditioning compositions of the present disclosure comprise certain alkyl quaternary ammonium ester materials, also called "ester quats" herein. Such ester quats may be useful for providing conditioning benefits such as softness, anti-wrinkle, anti-static, conditioning, anti-stretch, color, and/or appearance benefits to target fabrics. Additionally, the ester quats of the present disclosure are useful in building viscosity at relatively low active levels.

The liquid conditioning composition may comprise from about 2% to about 20%, or from about 2% to about 15%, or from about 2% to about 12%, by weight of the composition, of the ester quat softening active, described in more detail below. The composition may comprise from about 2% to about 10%, preferably from about 4% to about 8%, more preferably from about 5% to about 7%, by weight of the composition, of the ester quat softening active. The composition may comprise from about 2% to about 20%, by weight of the composition, of the ester quat softening active when the softening active comprises triester quat material. As described herein, the ester quats of the present disclosure are surprisingly effective at building viscosity in the liquid conditioning compositions, even when present at a relatively low level.

The ester quat softening actives are derived from a fatty acid feedstock. The fatty acid feedstock comprises fatty acids. The fatty acid feedstock may be partially hydrogenated, as such processes can provide the desired amount of trans fatty acids. By "partially hydrogenated" as used herein, it is meant that either the fatty acids themselves undergo a partial hydrogenation process, or that the oil from which the fatty acids are derived undergoes a hydrogenation process, or both. Additionally, partial hydrogenation processes can reduce the amount of double-unsaturated fatty acids, the presence of which may lead to color and/or odor instabilities in final product.

The fatty acids may be derived from plants. Suitable sources of plant-derived fatty acids may include vegetable oils, such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, and the like. Preferably, the fatty acid feedstock comprises fatty acids that are derived from cottonseed, rapeseed, sunflower seed, or soybean, preferably from cottonseed. These materials are particularly preferred because they tend to produce fatty acids having a desirable trans-unsaturation content upon partial hydrogenation. Thus, the fatty acid feedstock may comprise partially hydrogenated fatty acids derived from plants, preferably derived from vegetable oils, more preferably derived from canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, or mixtures thereof, more preferably derived from cottonseed, rapeseed, sunflower seed, soybean, or mixtures thereof. The fatty acid may comprise, at least in part, partially hydrogenated fatty acids derived from cotton seed oil, as such materials are believed to have advantageous distributions of fatty acid types and trans-unsaturated bonds.

The fatty acids may include an alkyl portion containing, on average by weight, from about 13 to about 22 carbon atoms, or from about 14 to about 20 carbon atoms, preferably from about 16 to about 18 carbon atoms, where the carbon count includes the carbon of the carboxyl group. The population of fatty acids may be present in a distribution of alkyl chains sizes. A particular fatty acid may be characterized by the number of carbons in its alkyl portion. For example, a fatty acid having sixteen carbons in the alkyl portion may be called a "C16 fatty acid." Likewise, a fatty acid having eighteen carbons in the alkyl portion may be called a "C18 fatty acid."

The fatty acid feedstock may comprise less than 25%, by weight of the fatty acid feedstock, of C16 fatty acids. The fatty acid feedstock may comprise from about 5% to about 25%, preferably from about 10% to about 25%, more preferably from about 15% to about 25%, even more preferably from about 20% to about 25%, by weight of the fatty acid feedstock, of C16 fatty acids. It may be desirable to limit the relative amount of C16 fatty acids in the fatty acid feedstock. Without wishing to be bound by theory, it is believed that it a relatively high proportion of C16 fatty acids (especially relative to C18 fatty acids) may lead to relatively lower viscosities in the final product.

Additionally or alternatively, it may be desirable to have at least a certain minimum of C16 fatty acids in the fatty acid feedstock (e.g., at least 10%, preferably at least 15%, even more preferably at least 20%, by weight of the fatty acid feedstock). Such materials can help to improve processability, as esterquats based on materials that include C16 fatty acids tend to have lower melting points and may be relatively easier to disperse compared to esterquats produced primarily from the more crystalline C18 (and/or C18-trans) fatty acids with low/nil levels of C16s.

The alkyl quaternary ammonium ester softening actives may comprise compounds formed from fatty acids that are unsaturated, meaning that the fatty acids comprise at least one double bond in the alkyl portion. The fatty acids may be monounsaturated (one double bond), or they may be di-unsaturated (or double-unsaturated; two double bonds). Preferably, most of the unsaturated fatty acids in the fatty acid feedstock are monounsaturated.

The fatty acids may comprise unsaturated C18 chains, which may include a single double bond ("C18:1") or may be double unsaturated ("C18:2"). (For reference, a fatty acid with a saturated C18 chain may be referred to as "C18:0".) The fatty acid feedstock may comprise from about 50% to about 85%, preferably from about 60% to about 80%, more preferably from about 70% to about 80%, by weight of the fatty acid feedstock, of C18 fatty acids, regardless of saturated or unsaturated status. The fatty acid feedstock may comprise from about 20% to about 60%, preferably from about 40% to about 60%, more preferably from about 45% to about 55%, by weight of the fatty acid feedstock, of C18:0 fatty acids. The fatty acid feedstock may comprise from about 15% to about 50%, preferably from about 15% to about 30%, preferably from about 18% to about 25%, by weight of the fatty acid feedstock, of C18:1 fatty acids. The fatty acid feedstock may comprise from 0% (e.g., none) to about 20%, or from about 0% to about 15%, or from about 0% to about 10%, or from about 0% to about 5%, by weight of the fatty acid feedstock, of C18:2 fatty acids. The fatty acid feedstock may comprise from about 1% to about 15%, preferably from about 5% to about 10%, by weight of the fatty acid feedstock, of C18:2 fatty acids.

The double bond(s) of an unsaturated fatty acid may be in the "cis" or in the "trans" conformation. As described above, it is believed that formulating liquid compositions with ester quat softening actives formed from fatty acid feedstocks that comprise a certain proportion of trans fatty acids can help to build viscosity. As illustrative examples, the structures of two monounsaturated fatty acids, both C18:1 fatty acids (one trans-, one cis-), are provided below.

Elaidic acid (trans)

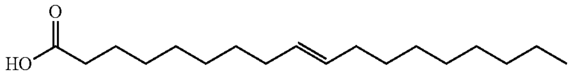

Oleic acid (cis)

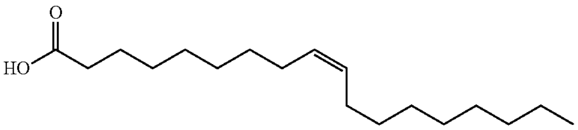

The fatty acid feedstock may comprise from about 4% to about 20%, by weight of the fatty acid feedstock, of trans-unsaturated fatty acids. The fatty acid feedstock may comprise from about 4% to about 15%, preferably from about 6% to about 12%, more preferably from about 8% to about 12%, by weight of the fatty acid feedstock, of trans-unsaturated fatty acids, preferably C18 trans-unsaturated fatty acids, more preferably C18 trans-monounsaturated fatty acids. As described above, the presence of trans-unsaturated fatty acids can help to build viscosity in the compositions of the present disclosure. Levels that are too low may not build enough viscosity; levels that are too high may negatively impact processability because such materials may have higher meting points, making it more difficult to properly disperse the esterquat.

The fatty acid feedstock may comprise C18 trans-unsaturated fatty acids, preferably C18 trans-monounsaturated fatty acids (e.g., C18:1 trans fatty acids). The C18 trans-unsaturated fatty acids (preferably trans-monounsaturated) may be present in an amount of from about 50% to about 100%, or from about 65% to about 100%, or from about 80% to about 100%, by weight of the total trans-unsaturated fatty acids.

The fatty acid feedstock, namely the trans-unsaturated fatty acids, may comprise elaidic acid, a trans C18:1 fatty acid, as shown above. The liquid conditioning composition may comprise elaidic acid at a level of: (a) from about 4% to about 20%, preferably from about 4% to about 15% by weight of the fatty acid feedstock, and/or (b) at a level of from about 50% to about 100%, preferably from about 75% to about 100% by weight of the trans-unsaturated fatty acids.

The fatty acid feedstock may comprise both cis-unsaturated fatty acids and trans-unsaturated fatty acids. The weight ratio of the cis-unsaturated fatty acids to the trans-unsaturated fatty acids ("cis:trans ratio") may be from about 1:2 to about 2:1, or from about 1:1.8 to about 1.8:1, or from about 1:1.6 to about 1.6:1, or from about 1:1.5 to about 1.5:1.

To determine the amount of trans-unsaturated fatty acids in a fatty acid feedstock, the fatty may first be reacted to form fatty acid methyl esters. (If dealing with the ester quat material, the ester quats may first be hydrolyzed into, among other things, fatty acids, which may then be converted into fatty acid methyl esters.) From there, the method set forth in ISO 12966-4:2015 may be used to determine the fatty acid methyl esters present (and by extension, the fatty acids present in the feedstock) by capillary gas chromatography (GLC). For example, fatty acid methyl esters from C8 to C24 can be separated using this method, including saturated fatty acid methyl esters, cis- and trans-monounsaturated fatty acid methyl esters, and cis- and trans-polyunsaturated fatty acid methyl esters. To note, for such measurements, it is desirable to convert the fatty acids to fatty acid methyl esters in order to improve the volatility of the compounds.

The fatty acid feedstock may be characterized by an iodine value, which relates to the amount of unsaturated fatty acids in the feedstock. The fatty acid feedstock may be characterized by an iodine value of from about 5 to about 60, or from about 5 to about 50, or from about 10 to about 35, or from about 15 to about 30. As described above, it is desirable that the fatty acid feedstock include some trans-unsaturated fatty acids in order to build viscosity in the final product. The presence of unsaturated fatty acids can also facilitate more convenient processing of the materials. That being said, very high levels of unsaturated fatty acid chains are to be avoided to minimize malodour formation as a result of oxidation of the liquid conditioning composition over time. Additionally, it is believed that feedstocks having relatively high levels of unsaturated fatty acid chains (for example, as indicated by a relatively high iodine value) are less likely to build viscosity as well as feedstocks characterized by lower levels and/or lower iodine values. Iodine value is determined according to the methods provided in the Test Method section below.

Suitable alkyl quaternary ammonium ester compounds may include materials selected from the group consisting of monoester quaternary material ("monoester quats"), diester quaternary material ("diester quats"), triester quaternary material ("triester quats"), and mixtures thereof.

The level of monoester quat may be from 2.0% to 40.0%, the level of diester quat may be from 40.0% to 98.0%, and the level of triester quat may be from 0.0% to 30.0%, by weight of total ester quat softening active. The level of monoester quat may be from 2.0% to 40.0%, the level of diester quat may be from 40.0% to 98.0%, and the level of triester quat may be less than 5.0%, or less than 1.0%, or even 0.0%, by weight of total ester quat softening active. The level of monoester quat may be from about 4% to about 25%, the level of diester quat may be from about 75 to about 96%, and the level of triester quat may be 0.0%, by weight of total ester quat softening active. The level of monoester quat may be from 15.0% to 35.0%, the level of diester quat may be from 40.0% to 60.0%, and the level of triester quat may be from 10% to 38.0%, by weight of total ester quat softening active. The relative amounts of mono-, di-, and triester quats may be determined by the method provided in the Test Method section below.

The quaternary ammonium ester compound may comprise triester quaternary ammonium material ("triester quats"). The ester quat softening active may comprise from about 10% to about 30%, preferably from about 15% to about 30%, more preferably from about 20% to about 25%, by weight of the ester quat softening active, of triester quat material. Such materials at these levels are found to provide useful conditioning benefits, while also being convenient to manufacture. The ester quat may comprise from about 10% to about 40%, or from about 10% to about 30%, or from about 15% to about 30%, by weight of the ester quat material, of compounds derived from triethanolamine and C18:1 fatty acids. Such levels of fatty acids may facilitate handling of the resulting ester quat material.

Suitable alkyl quaternary ammonium ester softening actives may be derived from alkanolamines, for example, C1-C4 alkanolamines, preferably C2 alkanolamines (e.g., ethanolamines). The quaternary ammonium ester compounds may be derived from monoalkanolamines, dialkanolamines, trialkanolamines, or mixtures thereof, preferably monoethanolamines, diethanolamines, di-isopropanolamines, triethanolamines, or mixtures thereof. The quaternary ammonium ester compounds may be derived from diethanolamines. The quaternary ammonium ester compounds may be derived from di-isopropanolamines. The quaternary ammonium ester compounds may be derived from triethanolamines. The alkanolamines from which the quaternary ammonium ester compounds are derived may be alkylated mono- or dialkanolamines, for example C1-C4 alkylated alkanolamines, preferably C1 alkylated alkanolamines (e.g, N-methyldiethanolamine).

The alkyl quaternary ammonium ester softening actives may comprise a quaternized nitrogen atom that is substituted, at least in part. The quaternized nitrogen atom may be substituted, at least in part, with one or more C1-C3 alkyl or C1-C3 hydroxyl alkyl groups. The quaternized nitrogen atom may be substituted, at least in part, with a moiety selected from the group consisting of methyl, ethyl, propyl, hydroxyethyl, 2-hydroxypropyl, 1-methyl-2-hydroxyethyl, poly(C2-C3 alkoxy), polyethoxy, benzyl, more preferably methyl or hydroxyethyl.

The alkyl quaternary ammonium ester softening actives may comprise compounds of the following formula:

$$\{R^2_{(4-m)}—N+—[X—Y—R^1]_m\}A^-$$

wherein:

m is 1, 2 or 3 with proviso that the value of each m is identical;

each $R^1$ is independently hydrocarbyl, or branched hydrocarbyl group, preferably $R^1$ is linear, more preferably $R^1$ is partially unsaturated linear alkyl chain;

each $R^2$ is independently a $C_1$-$C_3$ alkyl or hydroxyalkyl group, preferably $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl;

each X is independently $—(CH_2)n-$, $—CH_2—CH(CH_3)—$ or $—CH(CH_3)—CH_2—$ and each n is independently 1, 2, 3 or 4, preferably each n is 2;

each Y is independently —O—(O)C— or —C(O)—O—;

A- is independently selected from the group consisting of chloride, methyl sulfate, and ethyl sulfate, preferably $A^-$ is selected from the group consisting of chloride and methyl sulfate, more preferably A- is methyl sulfate;

with the proviso that when Y is —O—(O)C—, the sum of carbons in each $R^1$ is from 13 to 21, preferably from 13 to 19. It may be preferred that X is independently selected from $—CH_2—CH(CH_3)—$ and $—CH—(CH_3)—CH_2—$ to improve the hydrolytic stability of the quaternary ammonium ester compound, and hence further improve the stability of the fabric treatment composition.

The ester quat material may be produced in a two-step synthesis process. First, an esteramine may be produced by running an esterification reaction using fatty acids and an alkanolamine. In a second step, the product may be quaternized using an alkylating agent.

The liquid conditioning compositions of the present disclosure may comprise other conditioning agents in addition to the ester quats described above. The other conditioning agents may be selected from the group consisting of quaternary ammonium ester compounds other than those described above, silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof.

The composition may include a combination of a quaternary ammonium ester compound and a silicone. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1. When determining amounts of quaternary ammonium ester compounds as described in this paragraph, the amount may refer to ester quats as described in the previous section, or the total amount of ester quats as described above, plus any additional quaternary ammonium ester compounds that may be present.

Treatment Adjuncts

The liquid conditioning compositions of the present disclosure may comprise other treatment adjunct ingredients. The adjunct ingredients may be selected to provide, for example, processing, stability, and/or performance benefits.

Suitable treatment adjuncts may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, structurants, anti-agglomeration agents, coatings, formaldehyde scavengers, and/or pigments.

In particular, the liquid conditioning composition may further comprise a treatment adjunct selected from the group consisting of: additional conditioning agents, dyes, pH control agents, solvents, rheology modifiers, structurants, cationic polymers, surfactants, perfume, perfume delivery systems, chelants, antioxidants, preservatives, or mixtures thereof.

The precise nature of these additional components, and levels of incorporation thereof, will depend on the physical form of the composition and the nature of the operation for which the resulting composition is to be used. However, when one or more adjuncts are present, such one or more adjuncts may be present as detailed below. The following is a non-limiting list of adjunct ingredients that may be useful.

1. Rheology Modifier/Structurant

The liquid conditioning compositions of the present disclosure may contain a rheology modifier and/or a structurant. Rheology modifiers may be used to “thicken” or “thin” liquid compositions to a desired viscosity. Structurants may be used to facilitate phase stability and/or to suspend or inhibit aggregation of particles in liquid composition, such as perfume encapsulates as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon Inc. under the tradename Carbopol Aqua 30. Another suitable structurant is sold under the tradename Flosoft FS 222 available from SNF Floerger.

Despite the foregoing, it may be preferred that the liquid conditioning composition has a relatively low amount of structurant, if any. For example, synthetic materials may wish to be avoided, and/or the viscosity-building properties of the ester quat materials described herein may render the usage of a rheology modifier or structurant superfluous. Therefore, it may be preferred that liquid conditioning composition comprises less than 0.1%, preferably less than 0.05%, of a rheology modifier, a structurant, or a mixture thereof. The liquid conditioning composition may be substantially free of a rheology modifier, a structurant, or a mixture thereof 2. Cationic Polymer The liquid conditioning compositions of the present disclosure may comprise a cationic polymer. Cationic polymers may serve as deposition aids, e.g., facilitating improved deposition efficiency of softening and/or freshness actives onto a target surface. Additionally or alternatively, cationic polymers may provide stability, structuring, and/or rheology benefits to the composition.

The liquid conditioning compositions may comprise, by weight of the composition, from 0.0001% to 3%, preferably from 0.0005% to 2%, more preferably from 0.001% to 1%, or from about 0.01% to about 0.5%, or from about 0.05% to about 0.3%, of a cationic polymer.

Cationic polymers in general and their methods of manufacture are known in the literature. Suitable cationic polymers may include quaternary ammonium polymers known the “Polyquaternium” polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The cationic polymer may comprise a cationic polysaccharide, such as cationic starch, cationic cellulose, cationic guar, a cationic chitosan, or mixtures thereof. The cationic cellulose may comprise a quaternized hydroxyethyl cellulose. Polymers derived from polysaccharides may be preferred, being naturally derived and/or sustainable materials.

The cationic polymer may comprise a cationic acrylate. The cationic polymer may comprise cationic monomers, nonionic monomers, and optionally anionic monomers (so long as the overall charge of the polymer is still cationic. The cationic polymer may comprise cationic monomers selected from the group consisting of methyl chloride quaternized dimethyl aminoethylammonium acrylate, methyl chloride quaternized dimethyl aminoethylammonium methacrylate and mixtures thereof. The cationic polymer may comprise nonionic monomers selected from the group consisting of acrylamide, dimethyl acrylamide and mixtures thereof. The cationic polymer may optionally comprise anionic monomers selected from acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid (ATBS), and their salts.

The cationic polymer may substantially linear or may be cross-linked. The composition may comprise both a substantially linear cationic polymer (e.g., formed with less than 50 ppm cross-linking agent) and a cross-linked cationic polymer (e.g., formed with greater than 50 ppm cross-linking agent). Such combinations may provide both deposition and structuring benefits.

3. Surfactant

The liquid conditioning compositions may include less than 5%, or less than 2%, or less than 1%, or less than about 0.1%, by weight of the composition, of anionic surfactant, or even be substantially free of anionic surfactant. Anionic surfactants can negatively impact the stability and/or performance of the present compositions, as they may undesirably interact with cationic components such as the conditioning compounds. Product compositions intended to be added during the rinse cycle of an automatic washing machine, such as a liquid fabric enhancer, may include relatively low levels of anionic surfactant. Additionally or alternatively, compositions intended to be used in combination with a detergent composition during the wash cycle of an automatic washing machine may include relatively low levels of anionic surfactant.

The liquid conditioning compositions may comprise nonionic surfactant. Such surfactants may provide, for example, stability and/or processing benefits. The nonionic surfactants may be emulsifiers, for example, of perfume. The nonionic surfactants may be alkoxylated fatty alcohols, such as ethoxylated C10-C18 fatty alcohols.

4. Perfume and/or Perfume Delivery System

The liquid conditioning compositions may comprise perfume, a perfume delivery system, or a combination thereof. Such systems may improve the freshness performance of the compositions described herein. In particular, perfume delivery systems may facilitate improved freshness performance by increasing deposition efficiency, facilitating perfume release at different touchpoints, and/or increasing longevity of perfume performance.

Perfume may be present as neat oil, for example "free" perfume or unencapsulated perfume.

The perfume delivery system may comprise encapsulates, for example, where a core is surrounded by wall material ("core-shell encapsulates"); the core may comprise perfume and optionally a partitioning modifier (e.g., isopropyl myristate). The wall material may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol, or mixtures thereof. The melamine wall material may comprise melamine crosslinked with formaldehyde, melamine-dimethoxyethanol crosslinked with formaldehyde, and mixtures thereof encapsulates with such wall materials may be used in combination with a formaldehyde scavenger, such as acetoacetamide, urea, or derivatives thereof. The polyacrylate based wall materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof.

The encapsulates may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, a polysaccharide (e.g., chitosan), and combinations thereof.

The perfume delivery system may comprise particles that comprise a graft copolymer and a fragrance material, where the graft copolymer comprises a polyalkylene glycol (e.g., polyethylene glycol) as a graft base and one or more side chains that comprise vinyl acetate moieties.

The perfume delivery system may comprise a pro-perfume, for example a siloxane-based pro-perfume, where a perfume raw material is associated with (for example, via covalent bonding) a polymer (e.g., a siloxane polymer) upon delivery to a surface and is released upon or after treatment of a surface with the composition.

When the perfume delivery system includes formaldehyde derivatives, such as perfume encapsulates with melamine-formaldehyde shells, the composition may further comprise a formaldehyde scavenger, which may comprise a sulfur-based formaldehyde scavenger, a non-sulfur-based formaldehyde scavenger, or mixtures thereof. Suitable non-sulfur-based formaldehyde scavengers may include urea, ethylene urea, acetoacetamide, or mixtures thereof.

Suitable sulfur-based formaldehyde scavengers may include alkali and/or alkali earth metal dithionites, pyrosulfites, sulfites, bisulfites, metasulfites, monoalkyl sulphites, dialkyl sulphites, dialkylene sulphites, sulfides, thiosulfates, thiocyanates, mercaptans, thiourea, and mixtures thereof 5. Chelant The liquid conditioning compositions may comprise a chelant (aka, chelating agent). Such agents may be iron and/or manganese and/or other metal ion chelating agents. Such chelating agents can be selected from the group consisting of amino carboxylates, amino phosphonates, polyfunctionally-substituted aromatic chelating agents, and mixtures therein. If utilized, these chelating agents will generally comprise from about 0.1% to about 15%, preferably from about 0.1% to about 3.0%, by weight of the compositions described herein. More preferably, if utilized, the chelating agents will comprise from about 0.1% to about 3.0% by weight of such compositions.

Suitable chelants may include: diethylenetriaminepentaacetic acid (DTPA); hydroxyethanedimethylenephosphonic acid (HEDP); MGDA (methylglycinediacetic acid); glutamic acid, N,N-diacetic acid (GLDA); 1,2-diydroxybenzene-3,5-disulfonic acid (Tiron™); ethylenediamine disuccinate (EDDS); diethylenetriamine penta(methylene phosphonic acid) (DTPMP); ethylenediaminetetrakis (methylenephosphonates); ethylenediaminetetracetates; N-(hydroxyethyl) ethylenediaminetriacetates; nitrilotriacetates; ethylenediamine tetraproprionates; triethylenetetraaminehexacetates; diethylenetriamine-pentaacetates; ethanoldiglycines; alkali metal, ammonium, or substituted ammonium salts thereof; dihydroxydisulfobenzenes such as 1,2-dihydroxy-3,5-disulfobenzene; and mixtures thereof 6. Antioxidants The liquid conditioning compositions may comprise an antioxidant, preferably a phenolic antioxidant, more preferably a tocopherol antioxidant or a derivative thereof. Antioxidants in the presently disclosed composition may be useful for malodor control, cleaning performance, and/or color stability, as they may help to reduce yellowing that may be associated with amines. Furthermore, and without wishing to be bound by theory, it is believed that the presence of an antioxidant will reduce the rate of autooxidation of the trans-unsaturated bonds of the ester quat fatty acid chains and may therefore contribute to viscosity stability of the compositions. Antioxidants are substances as described in Kirk-Othmer (Vol. 3, page 424) and in Ullmann's Encyclopedia (Vol. 3, page 91).

The compositions of the present disclosure may include an antioxidant, preferably a phenolic antioxidant, even more preferably a tocopherol or a derivative thereof, in an amount of from about 0.001% to about 2%, preferably from about 0.01% to about 0.5%, by weight of the composition.

A specifically preferred class of antioxidants for use in the compositions of the present disclosure are tocopherols and derivatives thereof, such as tocotrienols. Such antioxidants are typically naturally derived and therefore may be of particular interest to be coupled with an ester quat material for sustainability/environmental reasons. Furthermore, such compounds may be viewed by the consumer as familiar, beneficial, and safe due to the vitamin E activity of the compounds. Tocopherols useful in the present compositions may include alpha-tocopherol, beta-tocopherol, gamma-tocopherol, delta-tocopherol, or combinations thereof.

Other suitable antioxidants may include other phenolic antioxidants, such as butylated hydroxytoluene ("BHT"; specifically, 3,5-di-tert-butyl-4-hydroxytoluene) and butylated hdroxyanisol ("BHA"). Still other suitable antioxidants may include Proxel GXL™, Trolox™, Raluquin™, and/or those sold under the TINOGARD® tradename.

7. Preservative

The liquid conditioning composition may comprise a preservative, which can help with product stability upon storage. The preservative may comprise a diphenyl ether antimicrobial agent, preferably 4-4'-dichloro-2-hydroxydiphenyl ether, 2,4,4'-trichloro-2'-hydroxydiphenyl ether, or combinations thereof. The preservative may comprise a quaternary ammonium antimicrobial agent, preferably dialkyl quaternary ammonium antimicrobial agents. Suitable preservative may include those sold under the TINOSAN and/or BARQUAT tradenames.

8. Additional Conditioning Agents

The liquid conditioning compositions of the present disclosure may comprise other conditioning agents in addition to the ester quats described above. The additional conditioning agents may be selected from the group consisting of quaternary ammonium ester compounds other than those described above, silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof.

The composition may include a combination of a quaternary ammonium ester compound and a silicone. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1. When determining amounts of quaternary ammonium ester compounds as described in this paragraph, the amount may refer to ester quats as described in the previous section, or the total amount of ester quats as described above, plus any additional quaternary ammonium ester compounds that may be present.

Concentrated Feedstock Composition

The present disclosure also relates to concentrated feedstock compositions that comprise the ester quat material described above, particularly those derived from fatty acids derived from cottonseed oil. Such feedstock compositions are useful in the manufacture of the liquid conditioning compositions described herein. For example, the ester quat material may be made and formulated into a concentrated feedstock composition, which may then be stored and/or transported, eventually being combined with an adjunct ingredient at another time or place to form a liquid conditioning composition according to the present disclosure.

A concentrated feedstock composition may comprise from about 60% to about 99%, or from about 75% to about 98%, or from about 80% to about 95%, by weight of the concentrated feedstock composition, of an alkyl ester quaternary ammonium ("ester quat") softening active, wherein the ester quat softening active is derived from a fatty acid feedstock, wherein the fatty acid feedstock comprises fatty acids that are derived, at least in part, from cottonseed oil, wherein the fatty acid feedstock comprises less than 25%, by weight of the fatty acid feedstock, of C16 fatty acids, and wherein the fatty acid feedstock comprises from about 4% to about 15%, by weight of the fatty acid feedstock of trans-unsaturated fatty acids; wherein the concentrated feedstock composition further comprises a liquid carrier selected from the group consisting of water, surfactant, or organic solvent. All of the fatty acids of the fatty acid feedstock may be derived from cottonseed oil.

The concentrated softening active composition may further comprise a liquid carrier. The liquid carrier may be selected from the group consisting of water, surfactant, or organic solvent. Suitable surfactants may include nonionic surfactants, such as alkoxylated fatty alcohols. Suitable organic solvents may include propanediol, ethanol, isopropanol, or propylene glycol.

Method of Making

The present disclosure relates to processes for making a liquid conditioning composition as described herein. The process of making a composition, which may be a fabric enhancer composition, may comprise the step of combining an ester quat material as describe herein with a treatment adjunct.

The liquid conditioning composition of the present disclosure can be formulated into any suitable liquid form and prepared by any process chosen by the formulator. The materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

The liquid conditioning composition may be placed into a pourable bottle by known methods. The liquid conditioning composition may be placed into an aerosol or other spray container according to known methods.

Method of Treatment

The present disclosure further relates to methods of treating a surface, such as a fabric or hair, with a liquid conditioning composition. Such methods may provide conditioning and/or freshening benefits.

The method may include a step of contacting a surface, preferably a fabric, more preferably a fabric comprising cotton fibers, with a liquid conditioning composition of the present disclosure, optionally in the presence of water. The composition may be in neat form or diluted in a liquor, for example, a wash or rinse liquor. The composition may be diluted in water prior, during, or after contacting the surface or article. The surface, e.g. the fabric, may be optionally washed and/or rinsed before and/or after the contacting step. The composition may be applied directly onto a fabric or provided to a dispensing vessel or drum of an automatic laundry machine. The method may include drying the surface, for example passively and/or via an active method such as a laundry dryer. The method may occur during the wash cycle or the rinse cycle, preferably the rinse cycle, of an automatic washing machine.

For purposes of the present disclosure, treatment may include but is not limited to scrubbing and/or mechanical agitation. The fabric may comprise most any fabric capable of being laundered or treated in normal consumer use conditions.

Liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, the water to fabric ratio may be typically from about 1:1 to about 30:1.

Use

The present disclosure also relates to the use of an alkyl ester quaternary ammonium ("ester quat") softening active as described herein, preferably as part of a liquid conditioning composition, to condition cotton fibers. It is believed that such uses are likely to be particularly attractive to consumer who desire naturally derived products. Further, it is believed that ester quats derived from cottonseed oil fatty acids may be particularly compatible with cotton fibers, particularly in view of hydrolysis that may occur with regard to the ester quat, thereby resulting in the presence of free fatty acids.

More specifically, the present disclosure relates to the use of an alkyl ester quaternary ammonium ("ester quat") softening active, preferably as part of a liquid conditioning composition, to condition cotton fibers, where the ester quat softening active is derived from a fatty acid feedstock, where the fatty acid feedstock comprises fatty acids that are derived from cottonseed oil. Preferably, the fatty acids and/or the feedstock oil providing such fatty acids are partially hydrogenated. Preferably, the fatty acid feedstock comprises less than 25%, by weight of the fatty acid feedstock, of C16 fatty acids. Preferably, the fatty acid feedstock comprises from about 4% to about 20%, by weight of the fatty acid feedstock of trans-unsaturated fatty acids, preferably C18:1 trans fatty acids, more preferably elaidic acid. The ester quat material, the fatty acid feedstock materials, and treatment compositions are described in more detail above.

Combinations

Specifically contemplated combinations of the disclosure are herein described in the following lettered paragraphs. These combinations are intended to be illustrative in nature and are not intended to be limiting.

A. A liquid conditioning composition comprising: from about 2% to about 20%, by weight of the composition, of an alkyl ester quaternary ammonium ("ester quat") softening active, wherein the ester quat softening active is derived from a fatty acid feedstock, wherein the fatty acid feedstock comprises fatty acids that are derived from plants, wherein the fatty acid feedstock comprises less than 25%, by weight of the fatty acid feedstock, of C16 fatty acids, and wherein the fatty acid feedstock comprises from about 4% to about 20%, by weight of the fatty acid feedstock, of trans-unsaturated fatty acids.

B. A liquid conditioning composition comprising: from about 2% to about 20%, by weight of the composition, of an alkyl ester quaternary ammonium ("ester quat") softening active, wherein the ester quat softening active comprises from about 10% to about 30%, by weight of the ester quat softening active, of triester quat material, and wherein the ester quat softening active is derived from a fatty acid feedstock, wherein the fatty acid feedstock comprises fatty acids that are derived from plants, wherein the fatty acid feedstock comprises less than 25%, by weight of the fatty acid feedstock, of C16 fatty acids, and wherein the fatty acid feedstock comprises from about 4% to about 20%, by weight of the fatty acid feedstock of trans-unsaturated fatty acids.

C. The liquid conditioning composition according to either of paragraphs A or B, wherein the fatty acid feedstock comprises from about 5% to about 25%, preferably from about 10% to about 25%, more preferably from about 15% to about 25%, even more preferably from about 20% to about 25%, by weight of the fatty acid feedstock, of C16 fatty acids.

D. The liquid conditioning composition according to any of paragraphs A-C, wherein the fatty acid feedstock comprises from about 4% to about 15%, preferably from about 6% to about 12%, more preferably from about 8% to about 12%, by weight of the fatty acid feedstock, of trans-unsaturated fatty acids, preferably C18 trans-unsaturated fatty acids, more preferably C18 trans-monounsaturated fatty acids.

E. The liquid conditioning composition according to any of paragraphs A-D, wherein the fatty acid feedstock comprises C18 trans-unsaturated fatty acids, preferably C18 trans-monounsaturated fatty acids, preferably in an amount of from about 80% to about 100%, by weight of the total trans-unsaturated fatty acids.

F. The liquid conditioning composition according to any of paragraphs A-E, wherein the trans-unsaturated fatty acids comprise elaidic acid, preferably present at a level of: (a) from about 4% to about 20%, preferably from about 4% to about 15%, by weight of the fatty acid feedstock, and/or (b) from about 50% to about 100%, preferably from about 75% to about 100%, by weight of the trans-unsaturated fatty acids.

G. The liquid conditioning composition according to any of paragraphs A-F, wherein the fatty acid feedstock comprises fatty acids that are derived from cottonseed, rapeseed, sunflower seed, or soy, preferably from cottonseed.

H. The liquid conditioning composition according to any of paragraphs A-G, wherein the fatty acids of the fatty acid feedstock are partially hydrogenated fatty acids.

I. The liquid conditioning composition according to any of paragraphs A-H, wherein the fatty acids of the fatty acid feedstock comprise cis-unsaturated fatty acids, and wherein the weight ratio of the cis-unsaturated fatty acids to the trans-unsaturated fatty acids ("cis:trans ratio") is from about 1:2 to about 2:1.

J. The liquid conditioning composition according to any of paragraphs A-I, wherein the fatty acid feedstock is characterized by an iodine value of from about from about 5 to about 60, preferably from about 5 to about 50, more preferably from about 10 to about 35, even more preferably from about 15 to about 30.

K. The liquid conditioning composition according to any of paragraphs A-I, wherein the composition comprises from about 2% to about 15%, preferably from about 2% to about 12%, more preferably from about 2% to about 10%, more preferably from about 4% to about 8%, even more preferably from about 5% to about 7%, by weight of the composition, of the ester quat softening active.

L. The liquid conditioning composition according to any of paragraphs A-K, wherein the ester quat softening active comprises from about 10% to about 30%, preferably from about 15% to about 30%, more preferably from about 20% to about 25%, by weight of the ester quat softening active, of triester quat material.

M. The liquid conditioning composition according to any of paragraphs A-M, wherein the composition further comprises water, preferably present in an amount of from about 40% to about 98%, or from about 50% to about 96%, or from about 75% to about 95%, or from about 80% to about 94%, by weight of the composition.

N. The liquid conditioning composition according to any of paragraphs A-M, wherein the liquid conditioning composition further comprises a treatment adjunct selected from the group consisting of: additional conditioning agents, dyes, pH control agents, solvents, rheology modifiers, structurants, cationic polymers, surfactants, perfume, perfume delivery systems, chelants, antioxidants, preservatives, or mixtures thereof.

O. The liquid conditioning composition according to paragraph N, wherein the treatment adjunct comprises an additional conditioning agent, preferably an additional conditioning agent selected from the group consisting of an additional alkyl quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, glyceride copolymers, or combinations thereof, more preferably silicones.

P. The liquid conditioning composition according to any of paragraphs N or O, wherein the treatment adjunct comprises perfume, a perfume delivery system, or a combination thereof, preferably wherein the perfume delivery system comprises core-shell encapsulates.

Q. The liquid conditioning composition according to any of paragraphs A-P, wherein the liquid conditioning composition comprises less than 0.1%, preferably less than 0.05%, of a rheology modifier, a structurant, or a mixture thereof.

R. The liquid conditioning composition according to any of paragraphs A-Q, wherein the liquid conditioning composition comprises an antioxidant, preferably a phenolic antioxidant, more preferably a tocopherol or a derivative thereof.

S. The liquid conditioning composition according to any of paragraphs A-R, wherein at least one of the following is true: (a) the ester quat softening active comprises a blend of at least a first ester quat softening active and a second ester quat softening active; and/or (b) the fatty acid feedstock comprises a blend of at least a first fatty acid feedstock and a second fatty acid feedstock.

T. The liquid conditioning composition according to any of paragraphs A-S, wherein the liquid conditioning composition is characterized by a viscosity of from about 50 cps to about 300 cps.

U. The liquid conditioning composition according to any of paragraphs A-T, wherein the liquid conditioning composition is characterized by a pH of from about from about 2 to about 4, preferably a pH of from about 2 to about 3.7, more preferably a pH from about 2 to about 3.5, wherein pH is determined by dissolving/dispersing the composition in deionized water to form a solution at 10% concentration at about 20° C.

V. A method of treating a surface, the method comprising the step of contacting a surface, preferably a fabric, more preferably a fabric comprising cotton fibers, with a liquid conditioning composition according to any of paragraphs A-U, optionally in the presence of water.

W. A concentrated softening active composition comprising: from about 60% to 99%, by weight of the composition, of an alkyl ester quaternary ammonium ("ester quat") softening active, wherein the ester quat softening active is derived from a fatty acid feedstock, wherein the fatty acid feedstock comprises fatty acids that are derived, at least in part, from cottonseed oil, wherein the fatty acid feedstock comprises less than 25%, by weight of the fatty acid feedstock, of C16 fatty acids, and wherein the fatty acid feedstock comprises from about 4% to about 20%, by weight of the fatty acid feedstock of trans-unsaturated fatty acids; and a liquid carrier selected from the group consisting of water, surfactant, or organic solvent.

X. Use of an alkyl ester quaternary ammonium ("ester quat") softening active, preferably as part of a liquid conditioning composition, to condition cotton fibers, wherein the ester quat softening active is derived from a fatty acid feedstock, wherein the fatty acid feedstock comprises fatty acids that are derived from cottonseed oil, preferably wherein the fatty acids and/or the cottonseed oil providing the fatty acids are partially hydrogenated, preferably wherein the fatty acid feedstock comprises less than 25%, by weight of the fatty acid feedstock, of C16 fatty acids, and preferably wherein the fatty acid feedstock comprises from about 4% to about 20%, by weight of the fatty acid feedstock of trans-unsaturated fatty acids.

Test Methods

Method of Measuring Iodine Value of a Quaternary Ammonium Ester Compound

The iodine value of a quaternary ammonium ester fabric compound is the iodine value of the parent fatty acid from which the fabric conditioning active is formed, and is defined as the number of grams of iodine which react with 100 grams of parent fatty acid from which the fabric conditioning active is formed.

First, the quaternary ammonium ester compound is hydrolysed according to the following protocol: 25 g of fabric treatment composition is mixed with 50 mL of water and 0.3 mL of sodium hydroxide (50% activity). This mixture is boiled for at least an hour on a hotplate while avoiding that the mixture dries out. After an hour, the mixture is allowed to cool down and the pH is adjusted to neutral (pH between 6 and 8) with sulfuric acid 25% using pH strips or a calibrated pH electrode.

Next the fatty acid is extracted from the mixture via acidified liquid-liquid extraction with hexane or petroleum ether: the sample mixture is diluted with water/ethanol (1:1) to 160 mL in an extraction cylinder, 5 grams of sodium chloride, 0.3 mL of sulfuric acid (25% activity) and 50 mL of hexane are added. The cylinder is stoppered and shaken for at least 1 minute. Next, the cylinder is left to rest until 2 layers are formed. The top layer containing the fatty acid in hexane is transferred to another recipient. The hexane is then evaporated using a hotplate leaving behind the extracted fatty acid.

Next, the iodine value of the parent fatty acid from which the fabric conditioning active is formed is determined following ISO3961:2013. The method for calculating the iodine value of a parent fatty acid comprises dissolving a prescribed amount (from 0.1-3 g) into 15 mL of chloroform. The dissolved parent fatty acid is then reacted with 25 mL of iodine monochloride in acetic acid solution (0.1M). To this, 20 mL of 10% potassium iodide solution and 150 mL deionised water is added. After the addition of the halogen has taken place, the excess of iodine monochloride is determined by titration with sodium thiosulphate solution (0.1M) in the presence of a blue starch indicator powder. At the same time a blank is determined with the same quantity of reagents and under the same conditions. The difference between the volume of sodium thiosulphate used in the blank and that used in the reaction with the parent fatty acid enables the iodine value to be calculated.

Method of Measuring Fatty Acid Chain Length Distribution

The fatty acid chain length distribution of the quaternary ammonium ester fabric conditioning active refers to the chain length distribution of the parent fatty acid from which the fabric conditioning active is formed. It can be measured on the quaternary ammonium ester conditioning active or on the fatty acid extracted from the fabric softener composition as described in the method to determine the iodine value of a quaternary ammonium ester fabric conditioning active. The fatty acid chain length distribution is measured by dissolving 0.2 g of the quaternary ammonium ester conditioning active or extracted fatty acid in 3 mL of 2-butanol, 3 glass beads are added and the sample is vortexed at high speed for 4 minutes. An aliquot of this extract is then transferred into a 2 mL gas chromatography vial, which is then injected into the gas chromatogram inlet (250° C.) of the gas chromatograph (Agilent GC6890N) and the resultant bi-products are separated on a DB-5 ms column (30 m×250 μm×1.0 μm, 2.0 mL/min). These bi-products are identified using a mass-spectrometer (Agilent MSD5973N, Chemstation Software version E.02.02) and the peak areas of the corresponding fatty acid chain lengths are measured. The fatty acid chain length distribution is determined by the relative ratios of the peak areas corresponding to each fatty acid chain length of interest as compared to the sum of all peaks corresponding to all fatty acid chain lengths.

Method of % of Monoester/Diester/Triester Quats

Dilute esterquat solutions are prepared by dissolving around 100 mg of esterquat material in about 2 mL of a 2:1 weight mixture of acetone-d6 and chloroform-d. Proton NMR spectra of the solutions are collected using standard proton acquisition parameters with a 15 second relaxation delay. The esterquat peaks are identified and the spectrum is integrated. The normalized weight percents of the monoesterquats, the diesterquats, and the triesterquats are calculated from their integrated areas.

Method for Determining Dynamic Yield Stress

Dynamic yield stress is measured using a controlled stress rheometer (such as an HAAKE MARS from Thermo Scientific, or equivalent), using a 60 mm parallel plate and a gap size of 500 microns at 20° C. The dynamic yield stress is obtained by measuring quasi steady state shear stress as a function of shear rate starting from 10 $s^{-1}$ to $10^{-4}$ $s^{-1}$, taking 25 points logarithmically distributed over the shear rate range. Quasi-steady state is defined as the shear stress value once variation of shear stress over time is less than 3%, after at least 30 seconds and a maximum of 60 seconds at a given shear rate. Variation of shear stress over time is continuously evaluated by comparison of the average shear stress measured over periods of 3 seconds. If after 60 seconds measurement at a certain shear rate, the shear stress value varies more than 3%, the final shear stress measurement is defined as the quasi state value for calculation purposes. Shear stress data is then fitted using least squares method in logarithmic space as a function of shear rate following a Herschel-Bulkley model:

$$\tau=\tau_0+k\dot{\gamma}^n$$

wherein τ is the measured equilibrium quasi steady state shear stress at each applied shear rate γ, $\tau_0$ is the fitted dynamic yield stress. k and n are fitting parameters.

EXAMPLES

The examples provided below are intended to be illustrative in nature and are not intended to be limiting.

Example 1. Method of Making the Ester Quat from FA Feedstock

Ester quat material is prepared in a two-step synthesis. First, an esteramine is produced by running an esterification reaction using fatty acid and an alkanolamine. In a second step, the amine portion is quaternized using an alkylating agent.

More specifically, 1000.8 g of a Fatty acid (acid value 201 mg KOH/g) is mixed with 272.5 g of triethanolamine (molar ratio FA:TEA of 1.95:1), and an esterification reaction is run at a temperature up to 165° C. Hypophosphorous acid (30 ppm) is used as a catalyst, and vacuum is applied to remove water. 220.2 g of dimethyl sulphate is added, and a quaternization reaction is run at 80° C. Finally, 121 g of isopropanol is added.

Example 2. Viscosity Data

Four fatty acid feedstocks are provided. Fatty acid descriptions and levels of the main fatty acids of each feedstock are provided in the Table 1 below. Each of Feedstocks 1~4 include approximately similar amounts of C18:1 fatty acids (20%, plus or minus 1.2%) and have similar iodine values. However, they vary in the amount of trans fatty acid, as well as the amount of C16 fatty acid.

Feedstocks 2 and 3 are comparative feedstocks, having, for example, relatively low levels of trans fatty acids and relatively high levels of C16 fatty acids; to note, Feedstock 3 has relatively more C16 fatty acid than Feedstock 2. Feedstock 4 is substantially equivalent to a 70:30 mixture by weight of Feedstock 1 and Feedstock 2.

TABLE 1

| Fatty acid description | Feedstock 1 | Feedstock 2 (comp.) | Feedstock 3 (comp.) | Feedstock 4 |
|---|---|---|---|---|
| C16 | 22.9 | 26.9 | 35.3 | 24.1 |
| C18:0 | 50.7 | 50.2 | 42 | 50.6 |
| C18:1 | 21.2 | 19.4 | 19.2 | 20.7 |
| C18:2 | 2.4 | 1.9 | 1.9 | 2.3 |
| C20 | 0.4 | 0.6 | 0.8 | 0.5 |
| C22 | 0.5 | 0.2 | 0.1 | 0.4 |

TABLE 1-continued

| Fatty acid description | Feedstock 1 | Feedstock 2 (comp.) | Feedstock 3 (comp.) | Feedstock 4 |
|---|---|---|---|---|
| Cis | 9.8 | 19.2 | 19 | 12.6 |
| Trans | 11.4 | 0.2 | 0.2 | 8.0 |
| Iodine Value | 21.7 | 20.3 | 20.1 | 21.3 |

The fatty acid feedstocks are used to make an ester quat softening active material by reacting them with triethanolamine in an esterification reaction and quaternizing the result.

The resulting ester quat softening materials are formulated into various simple liquid conditioning composition having the formulations below via a batch process. One product has an ester quat level of 5 wt % (Table 2); the other has an ester quat level of 7 wt % (Table 2). To note, the ester quats of Examples 4 and 8 are made by blending the ester quat materials made from Feedstocks 1 and 2 in a 70:30 weight ratio, resulting in ester quat material that is substantially equivalent to material that would be made from Feedstock 4.

The viscosity for each fresh composition is determined; the absolute viscosity (in cps) and a viscosity ratio vs. the products made with Feedstock 2 (having a low amount of trans fatty acids) are provided in Tables 2A and 2B. Ex. 2, Ex. 3, Ex. 6, and Ex. 7 are comparative examples, having been made with the comparative fatty acid feedstocks.

TABLE 2

| | Ex. 1 | Ex. 2 (comp.) | Ex. 3 (comp.) | Ex. 4 |
|---|---|---|---|---|
| Ester quat | 5% | 5% | 5% | 5% |
| Feedstock used to make the ester quat | Feedstock 1 | Feedstock 2 | Feedstock 3 | Equivalent of Feedstock 4 |
| Perfume | 0.50% | 0.50% | 0.50% | 0.50% |
| Water | Balance | Balance | Balance | Balance |
| Viscosity | 91 cps | 29 cps | 14 cps | 79 cps |
| Viscosity ratio vs. Ex. 2 | 3.1 | REF | 0.5 | 2.7 |

TABLE 3

| | Ex. 5 | Ex. 6 (comp.) | Ex. 7 (comp.) | Ex. 8 |
|---|---|---|---|---|
| Ester quat | 7% | 7% | 7% | 7% |
| Feedstock used to make the ester quat | Feedstock 1 | Feedstock 2 | Feedstock 3 | Equivalent of Feedstock 4 |
| Perfume | 0.70% | 0.70% | 0.70% | 0.70% |
| Water | Balance | Balance | Balance | Balance |
| Viscosity | 259 cps | 49 cps | 24 cps | 170 cps |
| Viscosity ratio vs. Ex. 6 | 5.3 | REF | 0.5 | 3.5 |

As shown in Tables 2 and 3, the liquid conditioning compositions having ester quats made with Feedstocks 1 and 4 are characterized by relatively higher absolute viscosities than those made with comparative Feedstocks 2 and 3. Furthermore, as shown by the viscosity ratios, the viscosities range from 2.7 to 5.3 times the viscosity of the selected reference composition. It is believed that these higher viscosities are largely due to the relatively high amount of trans fatty acids.

Furthermore, it is also believed that the high viscosities are in part enabled by relatively lower amounts of C16 fatty acids. As seen by comparing Ex. 2 to Ex. 3, or Ex. 6 to Ex. 7, relatively higher levels of C16 fatty acids lead to lower viscosity values when the trans fatty acid amounts are relatively similar.

Example 3. Exemplary Product Formulations

Table 4 shows exemplary product formulations of compositions according to the present disclosure. Specifically, the following compositions are intended as liquid fabric enhancer products.

TABLE 4

| | % Active (w/w) | | |
|---|---|---|---|
| Ingredient | Composition 1 | Composition 2 | Composition 3 |
| Alkyl quaternary ammonium ester softening active | 5% (Ester Quat 1)[1] | 7% (Ester Quat 2)[2] | 8% (Ester Quat 3)[3] |
| Perfume Encapsulates* | 0.25% | 0.25% | 0.25% |
| Formic Acid | 0.045% | 0.045% | 0% |
| Hydrochloric acid | 0.01% | 0% | 0% |
| Preservative | 0.0045% | 0% | 0% |
| Chelant | 0.0071% | 0.0071% | 0% |
| Structurant | 0.10% | 0.050% | 0% |
| Antifoam | 0.008% | 0.00% | 0.00% |
| Water | Balance | Balance | Balance |

[1]Ester Quat 1: Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from Feedstock 1 or Feedstock 4

[2]Ester Quat 2: N,N-bis(hydroxyethyl)-N,N-dimethyl ammonium chloride fatty acid ester, where the fatty acid esters are produced from Feedstock 1 or Feedstock 4

[3]Ester Quat 3: Esterification product of fatty acids with triethanolamine, quaternized with dimethyl sulphate, where the fatty acids are as provided in Feedstock 1 or Feedstock 4

*Core-shell perfume capsules. The "% Active" provided is the amount of fragrance delivered to the composition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid conditioning composition comprising:

from about 2% to about 20%, by weight of the composition, of an alkyl ester quaternary ammonium ("ester quat") softening active, wherein the ester quat softening active is derived from a fatty acid feedstock derived from plants, wherein the fatty acid feedstock comprises from about 15% to about 25%, by weight of the fatty acid feedstock, of C16 fatty acids, and wherein the fatty acid feedstock comprises fatty acids that are derived from cottonseed, wherein the fatty acid feedstock comprises from about 6% to about 12%, by weight of the fatty acid feedstock, of trans-unsaturated fatty acids, wherein the trans-unsaturated fatty acids comprise elaidic acid, and wherein elaidic acid is present at a level of:

(a) about 4% to about 20%, by weight of the fatty acid feedstock, and/or (b) about 50% to about 100%, by weight of the trans-unsaturated fatty acids.

2. The liquid conditioning composition according to claim 1, wherein elaidic acid is present at a level of:

(a) about 4% to about 15%, by weight of the fatty acid feedstock, and/or (b) about 75% to about 100%, by weight of the trans-unsaturated fatty acids.

3. The liquid conditioning composition according to claim 1, wherein the fatty acids of the fatty acid feedstock comprise cis-unsaturated fatty acids, and wherein the weight ratio of the cis-unsaturated fatty acids to the trans-unsaturated fatty acids ("cis:trans ratio") is about 1:2 to about 1:1.6.

4. The liquid conditioning composition according to claim 1, wherein the fatty acid feedstock is characterized by an iodine value of about 5 to about 60.

5. The liquid conditioning composition according to claim 1, wherein the composition comprises about 2% to about 15%, by weight of the composition, of the ester quat softening active.

6. The liquid conditioning composition according to claim 1, wherein the ester quat softening active comprises about 10% to about 30%, by weight of the ester quat softening active, of triester quat material.

7. The liquid conditioning composition according to claim 1, wherein the liquid conditioning composition further comprises a treatment adjunct selected from the group consisting of: additional conditioning agents, dyes, pH control agents, solvents, rheology modifiers, structurants, cationic polymers, surfactants, perfume, perfume delivery systems, chelants, antioxidants, preservatives, or mixtures thereof.

8. The liquid conditioning composition according to claim 1, wherein the liquid conditioning composition comprises less than 0.1%, of a rheology modifier, a structurant, or a mixture thereof.

9. The liquid conditioning composition according claim 1, wherein the liquid conditioning composition comprises an antioxidant.

10. The liquid conditioning composition according to claim 1, wherein the liquid conditioning composition is characterized by a viscosity of about 50 cps to about 300 cps.

11. A method of treating a surface, the method comprising the step of contacting a surface with a liquid conditioning composition according to claim 1, optionally in the presence of water.

12. The method according to claim 11, wherein the surface is a fabric comprising cotton fibers.

* * * * *